Patented Feb. 21, 1939

2,148,298

UNITED STATES PATENT OFFICE 2,148,298

CONTINUOUS PRODUCTION OF WATER GAS

Heinrich Koppers, Essen, Germany, assignor, by mesne assignments, to Koppers Company, Pittsburgh, Pa., a corporation of Delaware No Drawing. Application December 10, 1936, Serial No. 115,121. In Germany December 11, 1935

7 Claims. (Cl. 48—202)

The present invention relates to the continuous production of water gas and in particular to those processes for the continuous production of water gas, whereby the heat necessary for the formation of water gas will be transferred to the fuel by means of a mixture, consisting of water gas and steam, which has been heated up in a suitable heater to a high temperature before it comes into contact with the fuel.

The object of my present invention is to provide such improvements in said production of water gas, which will make the process more economical and also reduce the invested capital cost. Other advantages of my invention may be seen from the following:

If water gas is continuously produced in such a manner as I have mentioned it before, the highly heated mixture of water gas and steam will be introduced from below into a fuel column of sufficient height. The fuel may consist for instance of bituminous lump coal, lump brown coal or lignite, coke, briquetted fuel or the like. The mixture of water gas and steam flows upwards through the fuel bed and thus transmits its heat to the fuel, so that the steam will interact with the carbon of the fuel and steam and carbon will be converted in the well-known manner into carbon oxides and hydrogen, that is, water gas. Simultaneously, the fuel, if bituminous, will be degasified. Water gas and, as the case may be, distillation gas will be removed from the gas producer above the fuel bed or at another suitable place, whereupon the gas is again heated, after steam has been added, if necessary. A portion of the water-gas formed in the gas producer will be discharged from the gas producer or any suitable pipe line, connected therewith and leading the water gas to a point of use. This part of the water gas may then be used for other purposes, for instance for the synthesis of certain substances, such as hydrocarbons, ammonia or the like.

In order to circulate the gas-steam mixture between the water-gas producer and the gas heater, a mechanically driven blower, fan or the like will be used in most cases. Since such contrivances can only work satisfactorily if the temperature of the gas to be circulated is comparatively low, and since the temperature of the gas is usually comparatively high at the exit of the gas producer, it has been proposed to provide a cooler in the path of flow of the water gas between the gas producer and the gas heater at a point before the gas blower in order to cool down the gas to such a temperature, which is suitable for the blower or other apparatus.

The more particular object of my present invention consists in a modification of the operation of the process in a manner avoiding such a cooler in the continuous production of water gas. My invention contemplates for this purpose the idea of introducing the fuel to be treated into the gas producer with such a content of water that the hot gases arising in the fuel column are already cooled down inside the fuel bed of the gas producer by the water content of the fuel to such an extent that the temperature of the exit gases will be sufficiently low, without a separate supplementary cooling operation, for delivering the gas by means of ventilators, blowers or similar mechanical apparatus, preferably below 250 degrees centigrade.

The cooling down of the gas flow may be effected, according to my invention, by consuming the excess heat of the gas in evaporation of the water adhering to the fuel or contained in it. The steam thus formed will mix with the water gas, flowing into the heater and from thence into the gas producer, where the conversion with carbon takes place, thus also avoiding a special addition of steam which would have to be generated for instance in a special steam boiler.

If fuels, containing water, such as lignite, brown coal, shale coke or the like, have to be dealt with, the fuel then, according to my invention is only dried to such an extent, that the water left over in the fuel will suffice for cooling down the hot gases by extracting from them the heat necessary for the water evaporation. If for instance a brown coal containing about 48% of water is to be treated, the fuel will be dried down to about 15–14% of moisture before it is charged into the gas producer.

If, on the other hand, the fuel has a too low moisture content, then according to my invention, water will be added to same. This water may be added either before the fuel is filled into the gas producer or when it is already inside the gas producer. For this purpose, it is for instance possible to provide nozzles or other spraying arrangements in the upper part of the gas producer, by means of which water may be sprayed in finely atomized form into the fuel. The quantity of water will be adjusted, so that by consuming heat for the evaporation of the water, the temperature of the hot gases will decrease to the desired point.

Furthermore, my invention provides for reducing the temperature of the gas only to such an extent that, without any difficulties, it will be possible to pass the gas through an electric precipitator for the purpose of eliminating the tar, dust or other undesired constituents. This temperature lies preferably above the dew point of the gas for water, so that inside the electrical precipitator no water will condense out of the gas.

When carrying out the process according to my invention, it may be advantageous to deal for instance with a certain brown coal, containing about 48% of moisture, in which event the water will be extracted from the fuel down to about 17% before it enters the gas producer. The fuel then will be brought into contact with the gas mixture comprised of a mixture consisting of about four parts water-gas and one part steam in the gas producer.

The gas mixture before entering the gas producer is brought to a temperature of 1100° centigrade in a suitable heater. A tower-like regenerator, similar to the well-known Cowpers for blast furnaces may be used as a heater. If the fuel bed has a height of about 10 meters, the gases will leave the producer at the top with a temperature of about 130° centigrade. This temperature will be sufficient for preventing a condensation of water in the detarrers or other gas treatment apparatus and it is likewise favourable for the efficiency of the blower or ventilator, which serve to circulate the gas.

The temperature of the gas at the outlet of the gas producer and the necessary water contents of the fuel will depend upon various other circumstances for which no general rule can be given, as may be well understood by all skilled in the art. It is, however, clear, that these other circumstances can easily be determined empirically by previously investigating the fuel, if my invention is to be applied to kind of fuel other than that mentioned above.

My invention is hereinabove described and explained by way of specific examples, but it is to be understood that my invention is not limited in all its aspects to the modes of the above description since the invention may be variously embodied within the scope of the following claims.

Now what I claim is:—

1. In a method of producing water gas continuously comprising; passing a hot gas mixture of water-gas and steam in cyclic flow through a heating stage, in which the gaseous mixture is preheated to a temperature effective for carrying out a water-gas reaction of the steam with carbonaceous fuel in a subsequent water-gas reaction stage; and thence through a water-gas reaction stage, in which the gaseous mixture flows upwardly through and thereby reacts with carbon in the lower water-gas reaction part of a column of carbonaceous fuel fed at its upper part with fresh fuel to form water-gas from the steam of the gas mixture and thence through the fresh fuel on the sub-adjacent water-gas reaction part for pre-distillation of the fresh fuel with off flow of the gaseous mixture for cyclic flow from the fuel bed through the freshly fed-in fuel, and thence back to the heating stage, and which method involves the steps of maintaining the gas mixture in cyclic flow through the heating and lower water-gas reaction and upper distillation stages by mechanical acceleration of the flow of the gas mixture after it leaves the freshly fed-in fuel and before it enters the gas heating stage, with cooling of the gas mixture to a temperature below 2500° C. before it enters the mechanical acceleration step; the improvement comprising: maintaining in the fresh fuel zone of the water-gas reaction stage fresh fuel having a content of water sufficient to cool, by direct contact therewith, the gas mixture flowing off from column of fuel through the freshly fed-in fuel to a temperature below 250° C., and effecting the aforesaid cooling of the gas mixture for the mechanical acceleration step by heat exchange in the freshly fed-in fuel in the upper pre-distillation stage between the off flowing gas mixture and the aforesaid water content of the freshly fed-in fuel with the formation of steam therefrom.

2. A method as claimed in claim 1 and in which the fresh fuel of the aforesaid water content is maintained in the fresh fuel zone by introducing the fuel of such moisture content to the fresh fuel zone.

3. A method as claimed in claim 1 and in which the fresh fuel of the aforesaid water content is maintained in the fresh fuel zone by adding water directly to the fuel while in the fresh fuel zone.

4. A method as claimed in claim 1 and in which the fresh fuel of the aforesaid water content is maintained in the fresh fuel zone by spraying water thereon in finely atomized form while in the fresh fuel zone.

5. A method as claimed in claim 1 and which includes the step of removing tar from the gas mixture in advance of the mechanical acceleration step and in which the aforesaid cooling of the gas mixture for the gas mixture acceleration step is limited to cooling the gas mixture to a temperature above the dew point of the gas mixture for water so that water will not condense in the tar removal step.

6. A method as claimed in claim 1 and in which the aforesaid water content of the fresh fuel is maintained at between 14–17% of moisture.

7. A method as claimed in claim 1 and in which the gas mixture is cooled as aforesaid to a temperature of about 130° C.

HEINRICH KOPPERS.